United States Patent
Bemel

Patent Number: 6,159,429
Date of Patent: *Dec. 12, 2000

[54] APPARATUS FOR TREATING HYDROCARBON AND CARBON MONOXIDE GASES

[76] Inventor: Milton M. Bemel, 6501 N. Villa Manana Dr., Phoenix, Ariz. 85014

[*] Notice: This patent is subject to a terminal disclaimer.

[21] Appl. No.: 09/302,522

[22] Filed: Apr. 30, 1999

[51] Int. Cl.⁷ .................................................. B01D 53/34
[52] U.S. Cl. .......................... 422/177; 422/169; 422/170; 422/171; 422/228
[58] Field of Search ................... 422/17 D–171, 422/177, 180, 205, 169, 228; 60/299; 55/DIG. 30

[56] References Cited

U.S. PATENT DOCUMENTS

| | | | |
|---|---|---|---|
| 1,402,814 | 1/1922 | Wachtel | 422/177 |
| 3,186,806 | 6/1965 | Stiles | 422/177 |
| 3,220,794 | 11/1965 | Stiles | 422/177 |
| 3,259,453 | 7/1966 | Stiles | 422/177 |
| 3,754,619 | 8/1973 | McCormick | 181/50 |
| 5,142,864 | 9/1992 | Dunne | 60/274 |
| 5,185,998 | 2/1993 | Brew | 60/299 |
| 5,367,131 | 11/1994 | Bemel | 181/232 |
| 5,425,924 | 6/1995 | Finley | 422/176 |

*Primary Examiner*—Hien Tran
*Attorney, Agent, or Firm*—Warren F. B. Lindsley; Frank J. McGue

[57] ABSTRACT

An apparatus for purifying air which may act as a downstream supplement to a catalytic converter of an internal combustion engine for further reducing the hydrocarbon and carbon monoxide gases which the catalytic converter failed to remove. The apparatus comprises a housing filled with volcanic ash over which is directed a turbulent stream of exhaust gases for chemical reaction with the volcanic ash.

6 Claims, 2 Drawing Sheets

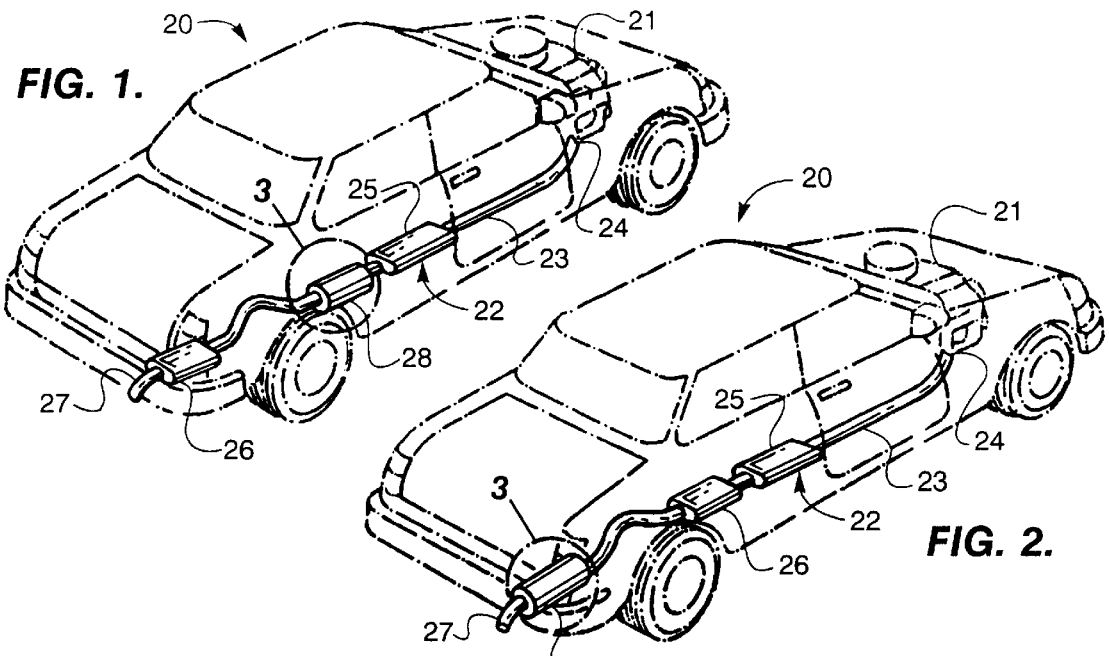
FIG. 1.
FIG. 2.
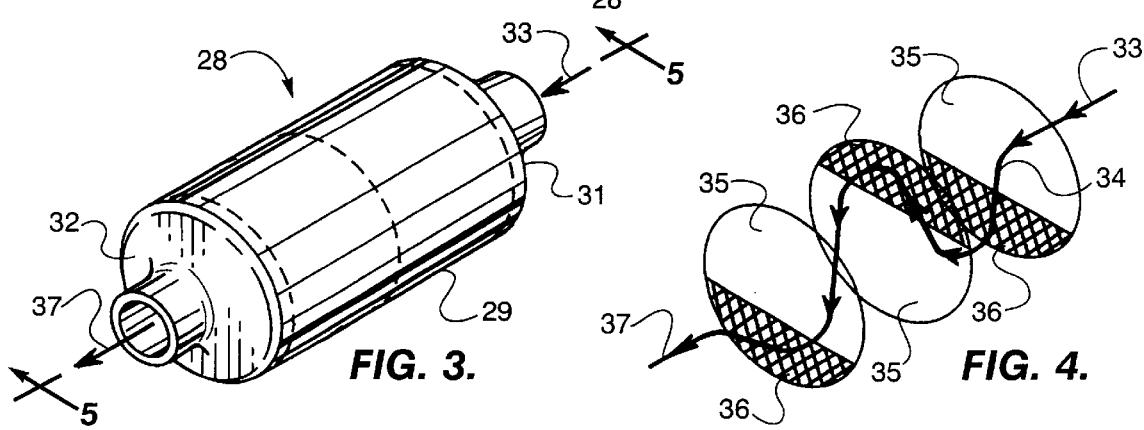
FIG. 3.
FIG. 4.
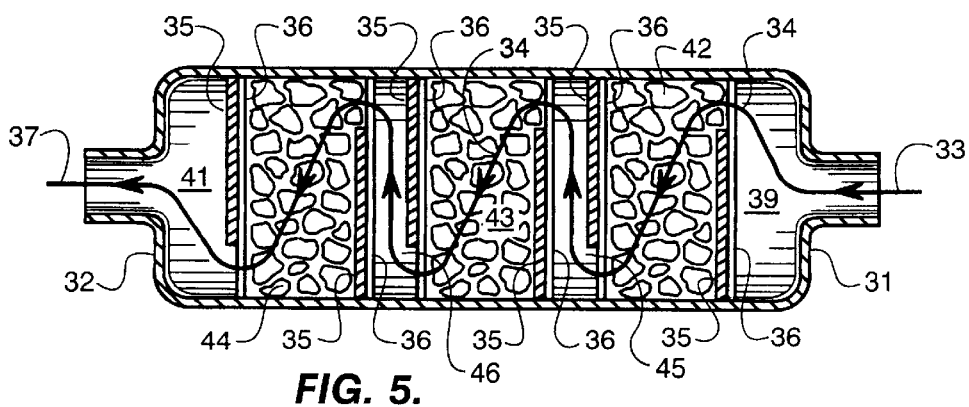
FIG. 5.

APPARATUS FOR TREATING HYDROCARBON AND CARBON MONOXIDE GASES

BACKGROUND OF THE INVENTION

This invention relates to the treatment of hydrocarbon and carbon monoxide gases issuing from various sources one of which is the gases issuing from a catalytic converter connected to the exhaust of an internal combustion engine. More particularly, this invention is directed to apparatus positioned downstream of the primary catalytic converter of an internal combustion engine for supplementing the function of the catalytic converter and may be positioned in the gas stream before, in place of or after the muffler.

Current automotive catalytic converters comprise a multichannel substrate having flow-through channels which are coated with noble metal catalyst materials that convert the pollutant exhaust gases to harmless effluent.

The automotive catalytic converters generally comprise a large, oval-shaped ceramic substrate housed in a metal sleeve or can. The converters are connected directly to a manifold exhaust pipe of an internal combustion engine and normally discharge purified gases through a muffler to atmosphere.

The catalytic converter is designed to reduce hydrocarbon (HC) and carbon monoxide (C)) emissions into carbon dioxide and water vapor. The converter also purges oxides of nitrogen (NOx) vapors from the exhaust. It is called catalytic because precious-metal catalysts inside the converter react with these toxic gases on the large surface area of an ingenious honeycomb coated with less than a gram of the catalytic material.

Most vehicles made after 1980 use this so-called monolithic converter. Pre 1980 vintage cars have pellet-type converter. Pellet converters contain thousands of tiny grains of ceramic reactants that produce a similar result.

Although the catalytic converter has been successful in removing some of the hydrocarbons and carbon monoxide from the exhaust gases of internal combustion engines, there remains a need for removing still more of these toxic gases exiting from the exhaust of the catalytic converter as well as from other sources of air contamination.

This can be accomplished by incorporating an add-on supplemental converter before, after or in place of the muffler. Such an add-on converter will further process the exhaust gases by passing them over a mineral substance that acts upon the remaining carbon monoxide and hydrocarbons, to further reduce the content of these substances in the exhaust gases.

DESCRIPTION OF THE PRIOR ART

U.S. Pat. No. 3,754,619 discloses a low back-pressure, straight through sound attenuating muffler for internal combustion engines comprising a series of spaced annular bodies of sound deadening material, the inner diameters of which define a gas flow path and the side faces of which define chambers within the muffler housing.

U.S. Pat. No. 5,142,864 discloses a process for treating an engine exhaust stream employing a catalyst, an adsorbent bed and a turbocharger.

U.S. Pat. No. 5,185,998 discloses catalytic converter accessory apparatus for improving the converter's efficiency and operational life. This accessory device has a housing disposed in the manifold exhaust pipe, upstream of the catalytic converter. The housing contains a hollow conduit that conveys the exhaust gases of the manifold to the entrance or interface of the catalytic converter. The conduit has a diffuser portion having a baffle plate disposed at the downstream end thereof, just before the converter inlet. The flow is divided into a bifurcated stream of gases that passes through the baffle plate. The outer stream of exhaust gas is caused to swirl as it passes through slots disposed at the end of the conduit ahead of the baffle plate. The major portion of the exhaust stream is caused to pass through a large central aperture in the baffle plate, along with the outer, swirling stream. This major portion of the exhaust stream maintains a substantially linear flow, thus reducing back pressure and turbulence in the overall flow.

U.S. Pat. No. 5,367,131, granted to the author of the present invention, discloses an apparatus which acts as a supplement to the catalytic converter of an internal combustion engine, functioning downstream thereof for further reducing the remaining hydrocarbon and carbon monoxide content. This apparatus operates in much the same fashion as the apparatus of the present invention but its structure is relatively complex and expensive. It is also believed to be less effective than the device of the present invention because it does not as thoroughly expose the exhaust gases to the mineral substance contained in the add-on converter.

SUMMARY OF THE INVENTION

In accordance with the invention claimed, a new and novel apparatus is disclosed for purifying air and which may act as a supplement to the catalytic converter of an internal combustion engine functioning downstream thereof for further reducing the remaining hydrocarbon and carbon monoxide gases which the catalytic converter failed to remove from the exhaust stream of gases into carbon dioxide and water vapor.

It is, therefore, one object of this invention to provide an improved catalytic converter system.

Another object of this invention is to provide an accessory apparatus for use downstream of a catalytic converter for further reducing or catalyzing the exhaust gases of an internal combustion engine.

A further object of this invention is to provide a supplemental catalytic device or apparatus which bathes or washes its exhaust gases received from a catalytic converter over a second catalytic substance that greatly reduces the undesirable hydrocarbons and carbon monoxide gases still existing in the exhaust gases of the catalytic converter.

A still further object of this invention is to provide a new and improved converter mounted downstream of the catalytic converter in the exhaust stream of gases from an internal combustion engine which, as a supplement to the catalytic converter, further reduces the hydrocarbons and carbon monoxide gases of the catalytic converter exhaust into carbon dioxide and water vapors.

Yet another object of this invention is to provide such a new and improved supplementary converter in a simple and inexpensive form that is nevertheless more efficient and effective in its removal of the hazardous materials.

Further objects and advantages of this invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of an automobile in dash lines showing the novel supplemental apparatus disclosed herein immediately downstream of a catalytic converter and upstream of a muffler;

FIG. 2 is a perspective view of the automobile shown in FIG. 1 with the supplemental apparatus disclosed herein positioned downstream of its muffler.

FIG. 3 is a perspective view showing the exterior of a first embodiment of the apparatus of the invention;

FIG. 4 is a diagrammatic illustration of the zig-zag path taken by the exhaust gas as it passes through the apparatus of the invention;

FIG. 5 is a longitudinal cross sectional view of the apparatus of the invention taken along line 5—5 of FIG. 3;

DESCRIPTION OF THE PREFERRED EMBODIMENTS

Figure 6:
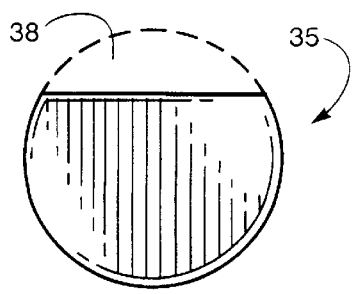
FIG. 6 is a plan view of a baffle plate incorporated in the apparatus to achieve the zig-zag path.

In accordance with the invention claimed, an improved device is provided for use as a supplement to an automotive catalytic converter system or any other air purifying system for removing pollutants from the exhaust gases whether human or machine generated. This device provides for a turbulent but uniform flow of the exhaust gases from the converter substrate or directly from a source of exhaust gases over a catalyst in a novel way to convert hydrocarbons and carbon monoxide into carbon dioxide and water vapor.

With reference to the drawings, FIGS. 1 and 2 disclose an automobile 20 both diagrammatically showing a motor 21 having an exhaust system 22 comprising a conduit 23 connecting the exhaust port 24 of the automobile through a catalytic converter 25, muffler 26, tail pipe 27 of the automobile to atmosphere. In accordance with the teaching of this invention, a supplemental device such as converter 28 is positioned in the exhaust system of the automobile with FIG. 1 illustrating converter 28 between the primary catalytic converter 25 and muffler 26 while in FIG. 2 supplemental converter 28 is positioned downstream of muffler 26.

Motor 21 comprises any internal combustion engine which generates an exhaust gas stream containing noxious components including unburned or thermally degraded hydrocarbons or similar organics. Other noxious components usually present in the exhaust gas include nitrogen oxides and carbon monoxide.

The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. Engine 21 may consist of a jet engine, gas turbine, internal combustion engine, such as an automobile, truck or bus engine, a diesel engine or the like. The process of this invention is particularly suited for treating an exhaust stream from a gasoline fueled automobile engine.

The engine exhaust stream is flowed through exhaust pipe system 22 and then through catalytic converter 25. The function of the catalytic converter is to convert the pollutants in the engine exhaust stream to innocuous components. When the engine is fueled by a hydrocarbon, the catalyst is referred to in the art as a three component control catalyst because it can simultaneously oxidize any residual hydrocarbons present in the engine exhaust stream to carbon dioxide and water, oxidize any residual carbon monoxide to carbon dioxide and reduce any nitric oxide to nitrogen and oxygen.

Although the exhaust gases flowing through the exhaust system of present day automobiles renders the exhaust gases relatively harmless, i.e., they meet present day limits, they still contain noxious gases which contribute to the contamination of the atmosphere. Accordingly, the supplemental converter 28 is provided to further improve the quality of the air.

In the first embodiment of the invention, the supplemental converter 28 is housed in a cylindrical casing 29. A casing with a cross section approximating an elongated oval will also serve. In either case the casing 29 is preferably a double-walled steel casing with an air space between the two walls for thermal and sound isolation. The two ends of the casing, i.e. the inlet end 31 and the exhaust end 32 of the casing may be tapered as shown in FIG. 3, or they may be cup-shaped as shown in FIGS. 1 and 2.

As shown in FIGS. 3–5, the exhaust gas 33 from catalytic converter 25 or muffler 26 enters supplemental converter 28 at end 31 and takes a zig-zag path 34 through successive internal stages defined by baffle plates 35 and retaining screens 36. The processed or cleaned gas 37 then exits at end 32.

As shown in FIG. 6, the baffle plate 35 comprises a circular plate with one edge 38 cut away. When plate 35 is mounted transversely inside casing 29, as shown in FIG. 5, it blocks the longitudinal flow of gas except through the opening left by the cut-away portion 38.

Figure 7:
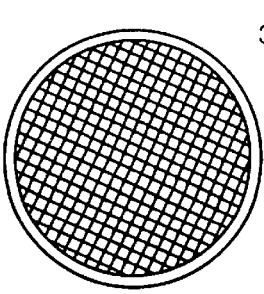
FIG. 7 is a plan view of a screen employed in conjunction with the baffle plate of FIG. 6 for the containment of the mineral material within certain enclosures of the apparatus.

In the supplemental converter of FIGS. 3–5, the barriers provided by baffle plates 35 must block the passage of the catalytic materials incorporated in the converter at the same time they permit the passage of the exhaust gases. For this purpose, the circular screen 36 as shown in FIG. 7 is installed against each of the baffle plates 35, as shown in FIGS. 4 and 5.

In the first embodiment of the invention, as shown in FIG. 5, five sets of barriers, each comprising a baffle plate 35 and a screen 36 define six serially arranged compartments, the six compartments comprising an entry chamber 39, an exhaust chamber 41, three catalytic chambers 42, 43 and 44, and two "empty" chambers 45 and 46. As the gas 33 flows through the supplemental converter 28 it passes first into entry chamber 39, then through catalytic chamber 42, then through "empty" chamber 45, through catalytic chamber 43, "empty" chamber 46, catalytic chamber 44 and finally through exhaust chamber 41 and exhaust end 32.

It is important to note that at each successive barrier position the baffle plate 35 is oriented oppositely, i.e. 180 degrees displaced from the orientation of the preceding baffle plate. Thus, as shown in FIG. 5, the first baffle plate 35 located between chamber 39 and chamber 42 has its opening at the top, the next has its opening at the bottom, the next at the top and so on to the exhaust end of the converter. By virtue of this arrangement, the exhaust gases being processed by converter 28 are constrained to take the zig-zag path 34.

The advantage of the zig-zag path is that the longer path it provides through the catalytic materials contained in the chambers 42, 43 and 44 increases contact between the gas and the catalytic materials resulting in a more thorough bathing of the catalytic material by the gas. In addition, the passage o the gas through the "empty" chamber 45 and 46 produces a turbulent mixing of processed and unprocessed contents. The resulting uniform mixture is believed to be beneficial to the operation of the succeeding catalytic stage.

While various catalytic materials have been found satisfactory for use in the converter 28, certain types of volcanic ash appear to offer the greatest promise. For maximum effectiveness the volcanic ash is crushed into relatively small pebbles. Dust and very fine particles are removed to prevent clogging and excessive back pressure.

Figure 8:
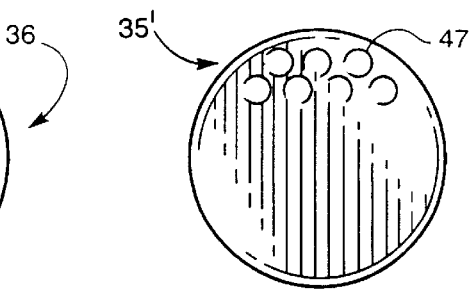
FIG. 8 is an alternate baffle plate configuration which incorporates the functions of the baffle plate of FIG. 6 and the screen of FIG. 7.

FIG. 8 shows an alternate version of the baffle plate. The baffle plate 35' of FIG. 8 is perforated in an area corresponding to the cut-away portion 38 of baffle plate 35. The perforations 47 must be large enough and must cover an area large enough to permit passage of the exhaust gases and they must be small enough to block passage of the catalytic particles. This version of the baffle plate eliminates the need for the screen 36.

Figure 9:
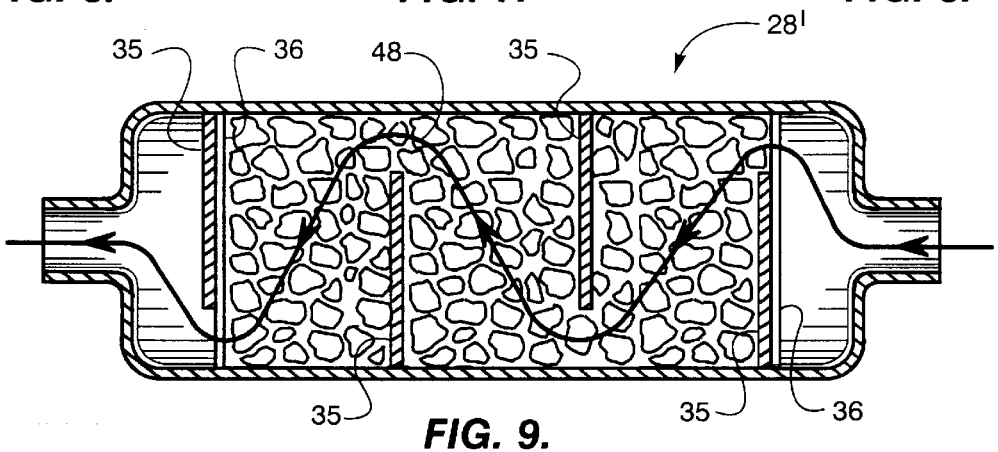
FIG. 9 is a longitudinal cross sectional view of a second embodiment of the invention.

While the "empty" chambers 45 and 46 of converter 28 are believed to be beneficial as indicated earlier, the simplified embodiment of FIG. 9 is also considered to fall within the scope of the invention. The supplementary converter 28' of FIG. 9 has not "empty" chambers but its single catalytic chamber is divided into sectors by means of baffle plates 35 which produce the zig-zag pattern 48 for improved contact between the gas stream and the catalytic material. Screens 36 are provided at the inlet and outlet ends of the catalytic chamber for the containment of the catalytic material but they are not needed at the intermediate baffle locations. Although the benefits attributed to the "empty" chambers of the supplementary converter are sacrificed in this embodiment, the loss of such benefits is at least partially offset by the larger quantity of catalytic material that can be accommodated in a converter of equivalent dimensions.

Figure 10:
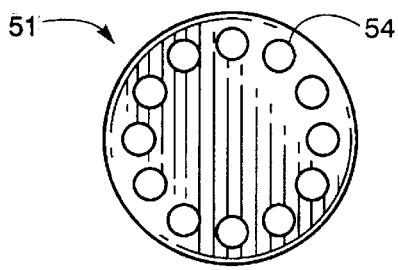
FIG. 10 is a plan view of a first baffle plate employed in a third embodiment of the invention.
Figure 11:
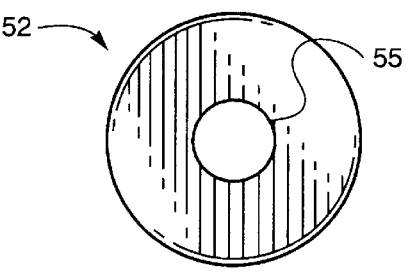
FIG. 11 is a plan view of a second baffle plate employed in the third embodiment of the invention.
Figure 12:
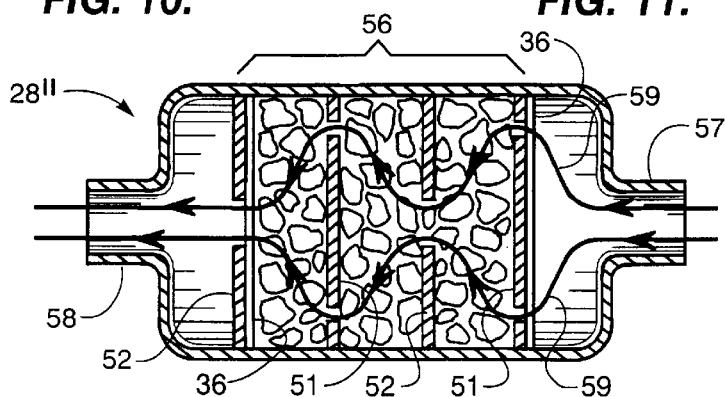
FIG. 12 is a longitudinal cross sectional view of the third embodiment of the invention.

FIGS. 10, 11 and 12 illustrate another version of the invention in which the gas is caused to pulsate radially inwardly and outwardly as it passes through the converter. FIGS. 10 and 11 illustrate the special baffle plates 51 and 52, respectively, that are required in the converter 28" of FIG. 12. Baffle plate 51 has circular apertures 54 distributed about its periphery while baffle plate 52 has a single circular opening 55 at its center.

As shown in FIG. 12, the converter 28" has a single catalytic chamber 56 that is divided into sectors by the baffle plates which produce the radial pulsations of the gas. At the inlet end 57 of converter 28" a baffle plate 51 is installed together with a circular screen 36 of the type shown in FIG. 7, these two parts defining the entry end of the catalytic chamber 56. At the exhaust end 58 of the converter, a baffle plate 52 and screen 36 define the exhaust end of the catalytic chamber 56. Two additional baffle plates 51 and 52 divide the catalytic chamber into three sectors. As illustrated, the successive baffle locations alternate with respect to the baffle type employed. Beginning at the inlet end 57 and progressing toward the outlet end 58, the first baffle plate is a plate 51 with its peripheral apertures; the second is a plate 52 with its central opening; the third is a plate 51; and the fourth is a plate 52. This arrangement produces the pulsating flow pattern 59 as illustrated.

The pulsating flow pattern produced in this embodiment of the invention with its associated pressure cycles and elongated flow path are believed to be beneficial in the enhancement of the conversion process.

An improved supplementary catalytic converter is thus provided in accordance with the stated objects of the invention, and although but a few embodiments have been illustrated and described, it will be apparent to those skilled in the art that various changes and modifications may be made therein without departing from the spirit of the invention or from the scope of the appended claims.

What is claimed is:

1. A supplemental catalytic converter for use in an automobile catalytic converter system having a primary catalytic converter for reducing noxious components of an exhaust gas stream from an engine of an automobile, said supplemental converter being disposed downstream of the primary catalytic converter in the exhaust gas stream to further reduce the noxious components of the exhaust gases received from the primary catalytic converter, said supplemental converter comprising:

a casing having an inlet end and an outlet end for connection in the exhaust stream of an automobile;

baffle means contained inside said casing and defining therein serially and alternately arranged catalytic chambers and empty chambers;

a pebbled volcanic ash catalytic material contained in each of said catalytic chambers;

each of said baffle means having an opening at one side for passage of the exhaust gas with each successive opening being displaced 180 degrees from the opening of the preceding baffle so that the exhaust gas stream is constrained to take a zig-zag path through said catalytic chambers and through said empty chambers; whereby said zig-zag path thereby producing a more thorough washing of said exhaust gases by said pebbled volcanic ash catalytic material; and said zig-zag path of said exhaust gas through said empty chambers producing turbulence in said gas stream, said turbulence further enhancing the effectiveness of said supplemental catalytic converter.

2. The supplemental catalytic converter of claim 1 in further combination with a screen for blocking passage of said pebbled volcanic ash catalytic material through said openings in said baffle means, one such screen being provided in association with each baffle means.

3. The supplemental catalytic converter of claim 2 in which said casing is cylindrical and said baffle means and said screens are circular.

4. The supplemental catalytic converter of claim 1 in which said opening is each of said baffle means comprises an array of perforations that are adapted to block passage of said pebbled volcanic ash catalytic material.

5. A supplemental catalytic converter for use in an automobile catalytic converter system having a primary catalytic converter for reducing noxious components of an exhaust gas stream from an engine of an automobile, said supplemental converter being disposed downstream of the primary catalytic converter in the exhaust gas stream to further reduce the noxious components of the exhaust gases received from the primary catalytic converter, said supplemental converter comprising:

a casing having an inlet end and an outlet end for connection in the exhaust stream of an automobile;

baffle means contained inside said casing and defining therein serially arranged sectors of a single catalytic chamber;

a pebbled volcanic ash catalytic material contained within said catalytic chamber;

each of said baffle means having an opening at one side for passage of the exhaust gas with each successive opening being displaced 180 degrees from the opening of the preceding baffle so that the exhaust gas stream is constrained to take a zig-zag path through said sectors of said catalytic chamber; whereby said zig-zag path thereby producing a more thorough washing of said exhaust gases by said pebbled volcanic ash catalytic material.

6. A supplemental catalytic converter for use in an automobile catalytic converter system having a primary catalytic converter for reducing noxious components of an exhaust gas stream from an engine of an automobile, said supplemental converter being disposed downstream of the primary catalytic converter in the exhaust gas stream to further reduce the noxious components of the exhaust gases received from the primary catalytic converter, said supplemental converter comprising:

a cylindrical casing having an inlet end and an outlet end for connection win the exhaust stream of an automobile;

baffle means contained inside said casing and defining therein serially arranged sectors of a single catalytic chamber;

said baffle means comprising first and second baffle configurations;

said first baffle configuration comprising a circular plate with circular apertures distributed about its periphery;

said second baffle configuration comprising a circular plate with a central opening;

a pebbled volcanic ash catalytic material contained in said catalytic chamber;

said first and said second baffle configurations being serially arranged in alternating succession such that each succeeding baffle configuration is different from the preceding baffle configuration with a plate of the first baffle configuration following a plate of the second baffle configuration, said plate of said second baffle configuration following another plate of said first baffle configuration and so forth; whereby said alternating baffle plates cause the exhaust stream to pulsate radially inwardly and radially outwardly as it passes through said supplemental converter; and said radial pulsations enhancing the washing action of the exhaust gases over the pebbled volcanic ash catalytic material.

* * * * *